United States Patent [19]

Umerez

[11] Patent Number: 4,857,885
[45] Date of Patent: Aug. 15, 1989

[54] BATTERY COUPLINGS TO PORTABLE SIGNALS WITH LONG PERIODS OUT OF SERVICE

[75] Inventor: Ignacio Z. Umerez, Onati, Spain

[73] Assignee: Celaya, Emparanza y Galdos, S.A. (Cegasa), Spain

[21] Appl. No.: 173,415

[22] Filed: Mar. 25, 1988

[30] Foreign Application Priority Data

Mar. 26, 1987 [ES] Spain .................................... 8700863

[51] Int. Cl.⁴ .............................................. G08B 5/00
[52] U.S. Cl. ..................................... 340/321; 429/27; 340/908.1
[58] Field of Search ...................................... 429/27–29, 429/97; 340/114 B, 114 R, 321

[56] References Cited

U.S. PATENT DOCUMENTS

| | | | |
|---|---|---|---|
| 2,468,430 | 4/1949 | Derksen | 429/27 |
| 3,818,439 | 6/1974 | Maine | 340/114 B X |
| 4,142,179 | 2/1979 | Lowndes | 340/321 |
| 4,493,880 | 1/1985 | Lund | 429/27 X |
| 4,620,111 | 10/1986 | McArthur et al. | 429/27 X |

Primary Examiner—Joseph A. Orsino
Assistant Examiner—Brian R. Tumm
Attorney, Agent, or Firm—Lucas & Just

[57] ABSTRACT

In the zone of coupling between the reflector body and the battery body of the signal, the general switch is accommodated, and connected with it is a displaceable element that follows the operating motion of said switch, so that when the latter is in the on position, the displaceable element opens the vents of the battery situated on the upper face of same, and vice versa.

7 Claims, 3 Drawing Sheets

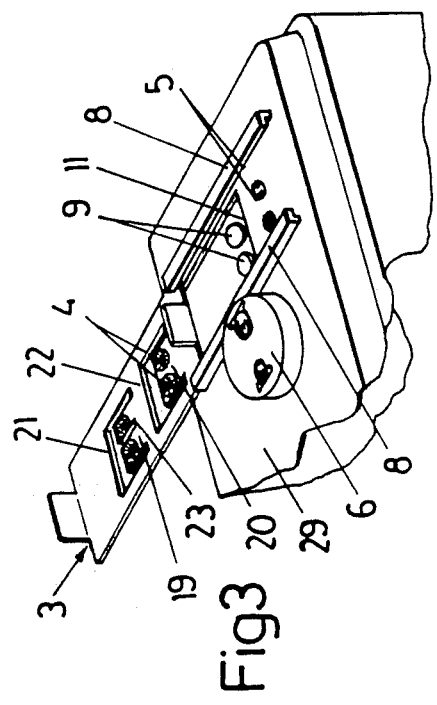
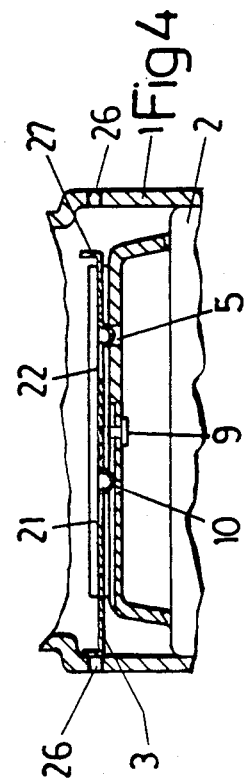
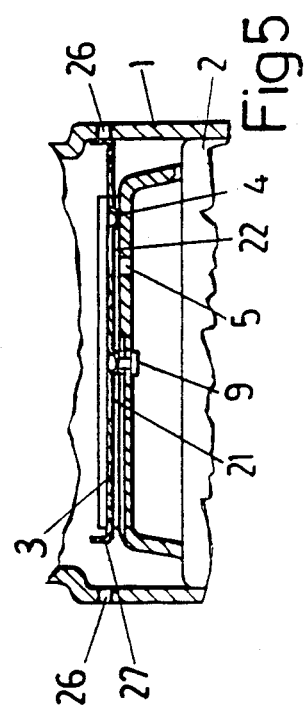
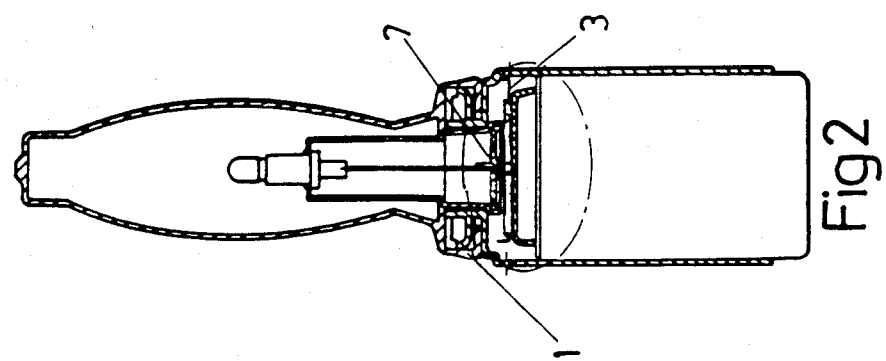
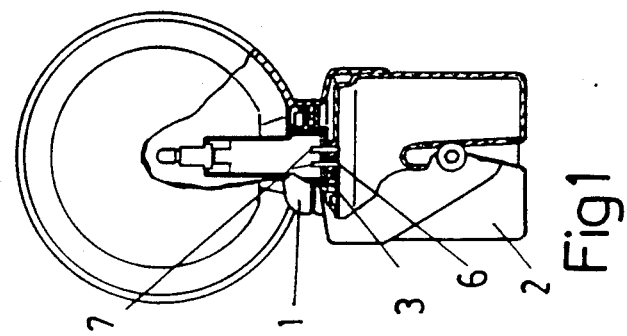

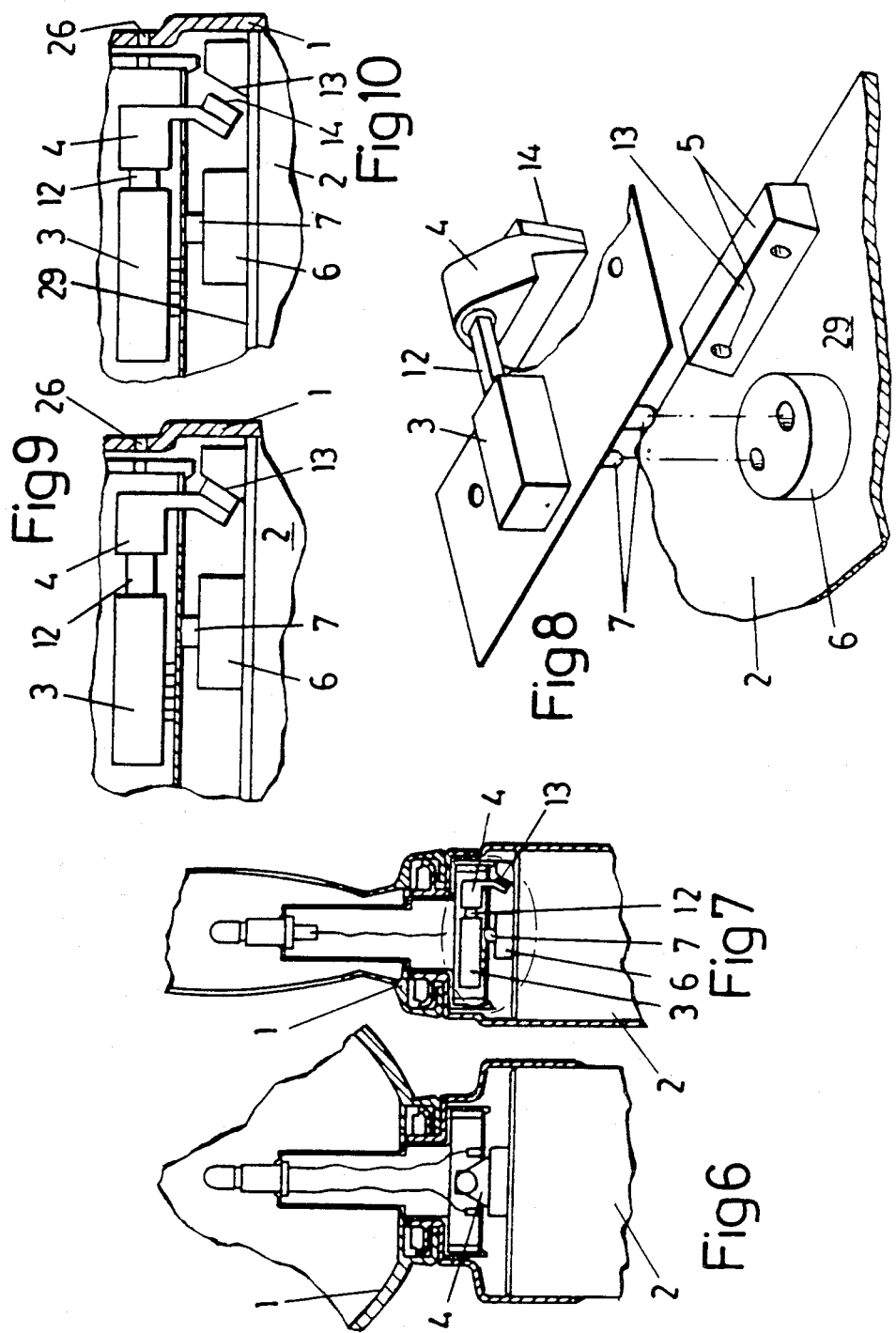

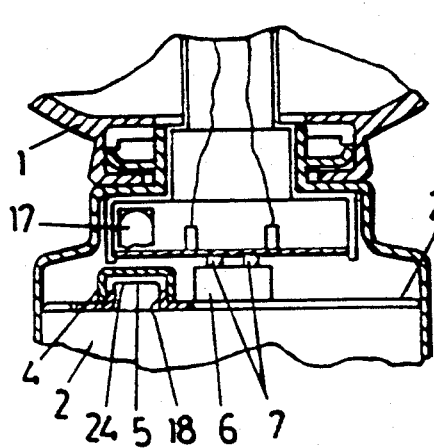
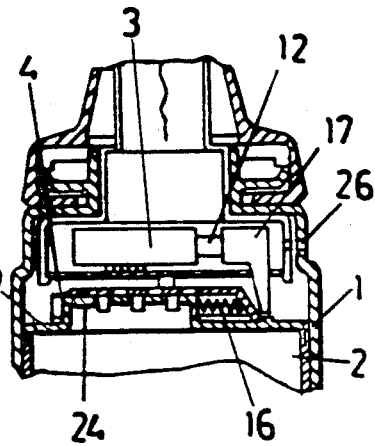
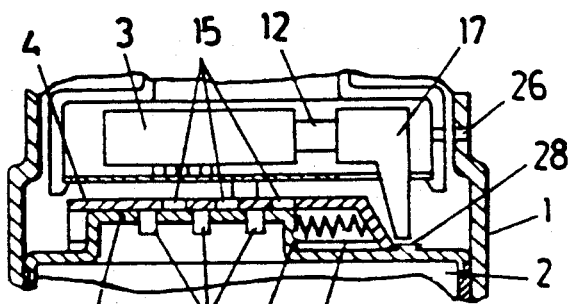
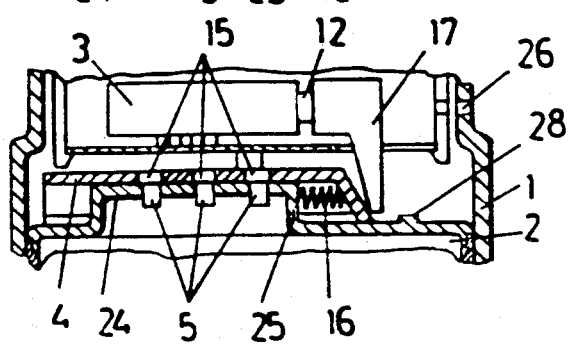

BATTERY COUPLINGS TO PORTABLE SIGNALS WITH LONG PERIODS OUT OF SERVICE

SCOPE OF THE INVENTION

This invention pertains to the field of portable optical signals of the type used for marking road works and other similar uses.

These signals commonly consist of an upper reflector body with optical, lighting and control elements, which by means of a plug-in connector is electrically coupled to a lower body constituted by a battery that provides autonomy of operation to the signal.

In particular, this invention pertains to different improvements in coupling between the upper reflector body and the lower battery body, its object being to improve substantially the conditions of use of these portable signals.

PRIOR STATE OF THE ART

In the manufacture of portable optical signals it is known that they incorporate a general operating switch and a photoelectric cell which, with the switch in on position, determines an intermittent operation of the signal when the ambient lighting level drops by a preestablished value.

The working conditions of these signals usually contemplate randomly prolonged periods of use in which they are stored away, once disconnected, awaiting a new introduction in service.

It is customary for these signals to use air depolarizer alkaline batteries that have a large capacity and permit prolonged use, although they cost several times more than other available options.

These air depolarizer alkaline batteries need to have vents to permit the entry of air, so that the oxygen contained will reach the positive pole and carry out depolarization. These vents come out of the factory with a seal that is removed when the battery is put into service for the first time, the latter remaining unsealed for the rest of its life.

The problem arises when, as occurs in the case of signals, there are long periods out of service with the vents open, therefore making possible the entry of air inside the battery, which is harmful to operation of the battery.

Damage to the battery is due to various principal reasons: on the one hand, when depolarization has already been carried out, if through a manufacturing defect the air entering the battery should reach the negative electrode, the active material of same will undergo oxidation, which will entail a loss of battery capacity; on the other hand, the relative humidity of the air, if high, will occlude the pores of the positive electrode, preventing access of the depolarizing oxygen and diminishing the efficiency of the battery and, if the relative humidity of the air is low, the electrolyte dries out, increasing its internal resistance and also causing a reduction of efficiency; finally, the carbon dioxide contained in the air is also harmful, since it reacts with the alkaline hydroxide of the electrolyte, forming the corresponding carbonate (generally, potassium carbonate), which lowers the conductivity of this electrolyte and causes a reduction of efficiency of the battery.

All of that further gives rise, in practice, to a series of malfunctions in operation of the signals and in the planning and performance of future work, since before they are put into service again there might not be sufficient signals in serviceable condition, permanently necessitating an expensive and painstaking recharging of the batteries, as well as the keeping of a considerable number of new batteries in the warehouse to substitute for those not suitable, and these batteries are high-cost. On the other hand, the problem has a chain reaction, since the new batteries face the same set of problems.

EXPLANATION OF THE INVENTION AND ADVANTAGES

This invention consists of improvements applicable to the coupling of batteries to portable signals, by means of which the set of problems presented is solved or at least alleviated to a large extent.

The improvements according to the invention consist of the fact that on the upper face of the lower body, by which the latter is brought up against the reflector body of the signal unit, there are vents from inside the battery and the zone of coupling between said reflector body and battery body accommodates the general switch, which has connected with it a displaceable stopper element that occludes in its travel the vents matching the off position of said general switch.

As can be appreciated, with this simple and ingenious arrangement, the off position of the general switch is made to match the stopping of the vents, and vice versa, so that when the signals are put out of service, the natural operation of said switch is sufficient to prevent the entry of air inside the battery and, when they are put into service again, the operation of the switch will enable the air to recirculate inside the battery.

The advantages of this invention are evident and consist, on the one hand, less of a need to store new batteries for replacement and on the other hand, operation is simplified and made less expensive and the efficiency of service and job planning is improved.

According to one preferred embodiment of the invention, the general switch and the displaceable stopper element form part of the battery body itself and are integrated in the same conducting piece or plate, capable of sliding, guided on two parallel rails drawn from the same material as the upper face of the battery body and in the space between which are situated the vents and two series contacts of the plug-in connector corresponding to this battery body, contactor prominences existing on the conductor plate (for the switch function in conjunction with the series contacts) along with other stopper prominences (for the occlusion function in conjunction with the vents), and the distance separating the pairs of prominences being greater than the distance separating its elements in conjunction from contacts and vents.

Within the scope of the invention, a preferred embodiment is possible, in which the general switch and the displaceable stopper element form part of the upper reflector body, the general switch having a plunger on which the displaceable stopper element is defined in a stopper lug of the pushbutton capable of occluding the vents which, opposite said stopper lug, are opened on a projecting inclined bearing surface defined on the upper face of the battery body and at an acute angle to the plane of the upper body.

One preferred embodiment of the invention also contemplates that the general switch will form part of the upper reflector body and the displaceable stopper element will form part of the lower battery body, the plunger of the general switch having a push lug opposite one end of the displaceable stopper element, which takes tangible form in a slide capable of being displaced against an antagonistic spring on parallel guides defined by the upper face of the battery body and between which guides the vents are arranged, said displaceable slide having holes distributed opposite the vents, but which in off position of the general switch are dephased in magnitude equivalent to the travel necessary for the general switch to adopt the off position.

The use of any of these embodiments of the invention will depend on the concrete characteristics of the reflector body to be employed in each case, which although they can sometimes be agreed upon, are other times imposed by the manufacturer of said reflector body, who is not the same as the one that manufactures the batteries. On the one hand, this serves to demonstrate the advantageous versatility of the invention in adapting to various possibilities.

DRAWINGS AND REFERENCES

To understand the nature of this invention better, we represent on the attached plans one preferred industrial embodiment, which is not limitative, but is given merely by way of illustrative example.

FIGS. 1 and 2 are each sectional views in front elevation and profile, which represent a portable optical signal according to the invention.

FIG. 3 is a view in perspective that represents the portion of the battery body (2) in which the recommended system is located.

FIGS. 4 and 5 are each expanded views of the surrounding sectional detail on FIG. 2 and represent the two operating positions of the invention.

FIGS. 6 and 7 are sectional views that represent in front elevation and profile the zone of coupling in a signal made according to a preferred embodiment of the invention.

FIG. 8 is a view in perspective of the invention, which corresponds to FIGS. 6 and 7 and shows the elements in their relative positions prior to coupling.

FIGS. 9 and 10 are each expanded sections that represent the two operating positions of the invention according to FIG. 7.

FIGS. 11 and 12 are sectional views that represent in front elevation and profile the zone of coupling in a signal made according to a preferred embodiment of the invention.

FIGS. 13 and 14 are each expanded sections that represent the two operating positions of the invention according to FIG. 12.

On these figures the following references are indicated:

1. Upper reflector body.
2. Lower battery body.
3. General switch.
4. Displaceable stopper element.
5. Vents.
6. Plug-in connector (female).
7. Plug-in connector (male).
8. Rails.
9. Series contacts.
10. Contactor prominences.
11. Transverse step.
12. Switch plunger.
13. Inclined bearing surface.
14. Liner.
15. Holes.
16. Antagonistic spring.
17. Push lug.
18. Guides.
19. Elastic switch tongue.
20. Elastic stopper tongue.
21. Tongue window (19).
22. Tongue window (20).
23. Fissure.
24. Super-elevation.
25. Transverse wall.
26. Drillhole.
27. Bend.
28. Retainer projection.
29. Upper face of the battery (2).

PRESENTATION OF A DETAILED APPLICATION

As can be seen on the drawings, the invention pertains to a portable optical signal like the one shown on FIGS. 1 and 2, which in its general design basically consists of the upper reflector body (1) that, including the optics, lamp, general switch and controls, is equipped with a male plug-in conductor (7) electrically coupled to the female plug-in connector (6) of the lower battery body (2).

FIGS. 3 to 5 illustrate the preferred embodiment of the invention, consisting of the fact that the vents (5) are made on the upper face of the body of the battery (2), forming a transversely aligned pair between two parallel rails (8) capable of displacing a conducting metal plate of elastic qualities, provided with a pair of stopper prominences (4) capable of occluding said vents (5) and a pair of contactor prominences (10) capable of establishing electric continuity between two contacts (9) arranged in series with the female plug-in connector (6), which series contacts (9) go beyond the lower level of the transverse step (11) that extends between said pairs of prominences (4, 10), but without going beyond the upper level, thereby ensuring an effective working electric contact without risk of accidental contacts of the displaceable plate itself when the prominences (10) are displaced from the series contacts (9).

The distance between the prominences (4, 10) is greater than that existing between the vents (5) and the series contacts (9) so that (FIGS. 4 and 5) in each of the two operating positions of the plate either the vents (5) are covered or the series contacts (9) are electrically connected; on the other hand, the position of said prominences (4, 10) along the plate and the length of the latter are such that in each of the two operating positions there is a bend (27) at the end of the plate next to the corresponding drillhole (26) of the reflector body (1) for the drive of said plate.

The prominences (4, 10) are shaped in the tongues (19, 20) that are projected over the windows (21, 22) stamped in the plate, facilitating elastic operation of the tongues (19, 20) for the effective use of the prominences; as represented in relation to the contactor prominences (10), there can be fissures (23) between said prominences to make the elastic action independent in order to absorb slight dimensional differences that might exist in the prominences themselves (10), in the series contacts (9) or in their respective distances, and the same thing can be said about the stopper prominences (4).

On FIGS. 6 to 10 the invention essentially consists of the fact that the general switch (3) is located on the upper reflector body (1) and has a plunger (12) on which is installed a displaceable stopper element that comprises a stopper lug (4) provided with an elastoplastic liner (14) designed to occlude the vents (5) that are made on the bearing surface (13) defined as an expansion of the battery body (2) itself. FIG. 9 represents the off position in which the stopper lug (4) with its liner (14) is seated on the surface (13). FIG. 10 shows the on position in which, through the drillhole (26) in the reflector body (1) it has been activated on the stopper lug (4), separating it from the vents (5) and turning on the switch, which retains this position until the stopper lug (4) is pressed again.

On FIGS. 11 to 14 the invention essentially consists of the fact that the general switch (3) is located on the reflector body (1), while the displaceable stopper element forms part of the battery body (2) and takes shape on the slide (4) that can be displaced on the guides (18) of the upper face (29) of said battery body (2). The plunger (12) is integral with the push lug (17) and the vents (5) are defined in a super-elevation (24) of the upper face of the battery body (2), there being an antagonistic spring (16) located between the transverse wall (25) of the super-elevation (24) and the end of the slide (4) opposite the push lug (17); the slide (4) has holes (15) capable in operation of matching the vents (5). FIG. 13 illustrates the off position of the switch (3), in which the push lug (17) is next to the end of the slide (4) and the vents (5) are occluded by the slide (4) itself. FIG. 14 illustrates the on position in which the push lug (17) has been brought through the drill hole (26) to the on position of the switch (3) and this lug (17) has displaced the slide (4) against the antagonistic spring (16) until making the holes (15) match the vents (5), this position being retained by the switch (3) until a new activation of said push lug (17) releases the position and the expansion of the antagonistic spring (16) causes the return of the slide (4) to the closing position of the vents (5), this position of the slide being retained by the projection (28) defined on the upper face of the battery body (2).

The nature of this invention as well as its industrial application having been sufficiently described, it only remains to be added that it is possible to introduce changes of form, material and design in the assembly and its component parts, within the content of the invention, as long as such modifications do not alter its principle.

I claim:

1. Improvements in battery couplings to portable signals with long periods out of service, said portable signal having an upper reflector body (1) with optical, lighting and control elements and a lower battery body (2) with electrochemical storage cells, said reflector and battery body coupled by a plug-in connector (6, 7) and a general switch (3) for putting said portable signal into service, characterized in that said battery body (2) has an upper face (29) which faces said reflector body (1) when said reflector and battery body are coupled, said upper face (29) having vents (5) therein into a zone of coupling between said reflector body (1) and said battery body (2); a displaceable stopper element (4) that is displaceable by said general switch (3) such that when said general switch (3) is in an off position said stopper element (4) occludes vents (5); the general switch (3) and the stopper element (4) form part of the battery body (2) and are integrated in the same conductor plate capable of sliding, guided on two parallel rails (8) drawn from the same material as the upper face (29) of the battery body (2) and in the space between which are situated the vents (5) and two contacts (9) of the plug-in connector (6) corresponding to the body (2), contactor prominences (10) existing on the conductor plate along with the stopper element (4), and the distance separating the contactor prominences (10) and stopper element (4) being greater than the distance separating the contacts (9) and the vents (5).

2. Improvements in battery couplings to portable signals with long periods out of service, according to claim 1, characterized in that in the space between the rails (8) there is a transverse step (11) of the upper face of the battery body (2) and the two contacts (9) go beyond the lower level of said transverse step (11) without going beyond the upper level of same.

3. Improvements in battery couplings to portable signals with long periods out of service, according to claim 1, characterized in that said stopper element (4) and contactors (10) are located in respective elastic tongues (19, 20) projected on corresponding windows (21, 22) of said conductor plate, fissures (23) being provided in said tongues (19, 20), defining individual tongue parts for each individual contactor (10) and element (4).

4. Improvements in battery couplings to portable signals with long periods out of service, said portable signal having an upper reflector body (1) with optical, lighting and control elements and a lower battery body (2) with electrochemical storage cells, said reflector and battery body coupled by a plug-in connector (6, 7) and a general switch (3) for putting said portable signal into service, characterized in that said battery body (2) has an upper face (29) which faces said reflector body (1) when said reflector and battery body are coupled, said upper face (29) having vents (5) therein into a zone of coupling between said reflector body (1) and said battery body (2); a displaceable stopper element (4) that is displaceable by said general switch (3) such that when said general switch (3) is in an off position said stopper element (4) occludes vents (5); the general switch (3) and the displaceable stopper element (4) form part of the upper reflector body (1), the general switch (3) having a plunger (12) on which the displaceable stopper element is defined in a stopper lug (4) of the pushbutton capable of occluding the vent (5) which, opposite said stopper lug (4), are opened on a projecting inclined bearing surface (13) defined on the upper face (29) of the battery body (2) and at an acute angle to the plane of the upper body (29).

5. Improvements in battery couplings to portable signals with long periods out of service, according to claim 4, characterized in that said stopper lug (4) has a liner (14) of elastoplastic material opposite the vents (5) opened on the inclined bearing surface (13).

6. Improvements in battery couplings to portable signals with long periods out of service, said portable signal having an upper reflector body (1) with optical, lighting and control elements and a lower battery body (2) with electrochemical storage cells, said reflector and battery body coupled by a plug-in connector (6, 7) and a general switch (3) for putting said portable signal into service, characterized in that said battery body (2) has an upper face (29) which faces said reflector body (1) when said reflector and battery body are coupled, said upper face (29) having vents (5) therein into a zone of coupling between said reflector body (1) and said battery body (2); a displaceable stopper element (4) that is displaceable by said general switch (3) such that when said general switch (3) is in an off position said stopper element (4) occludes vents (5); the general switch (3)

forms part of the upper reflector body (1) and the displaceable stopper element (5) forms part of the lower battery body (2), the general switch (3) having a push lug (17) opposite one end of the displaceable stopper element, which takes tangible form in a slide (4) capable of being displaced against an antagonistic spring (16) on parallel guides (18) defined by the upper face (29) of the battery body (2) and between which guides (18) the vents (5) are arranged, said displaceable slide (4) having holes (15) distributed opposite the vents (5) when said general switch (3) is in an on position.

7. Improvements in battery couplings to portable signals with long periods out of service, according to claim 6, characterized in that the vents (5) are made in a super-elevation (24) and the antagonistic spring (16) acts on a transverse wall (25) of said super-elevation and the end of the slide (4) opposite the push lug (17) connected to the general switch (3), a projection (28) retaining the slide in the off position of the general switch (3) being present on the upper face (29) of the battery body (2).

* * * * *